(12) United States Patent
Sadat et al.

(10) Patent No.: US 8,495,273 B2
(45) Date of Patent: Jul. 23, 2013

(54) SWITCH EMPLOYING PRECHARGE CIRCUITS

(75) Inventors: MD Anwar Sadat, Richardson, TX (US); Yanli Fan, Allen, TX (US); Huawen Jin, Plano, TX (US); Woo J. Kim, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 465 days.

(21) Appl. No.: 12/838,010

(22) Filed: Jul. 16, 2010

(65) Prior Publication Data
US 2012/0013390 A1    Jan. 19, 2012

(51) Int. Cl.
*G06F 13/00*    (2006.01)
*G06F 3/00*    (2006.01)

(52) U.S. Cl.
USPC ............................................. 710/316; 710/8

(58) Field of Classification Search
USPC ...................................................... 710/316, 8
See application file for complete search history.

(56) References Cited

U.S. PATENT DOCUMENTS

| 4,404,479 A * | 9/1983 | Toyomaki ...................... 327/95 |
| 5,949,735 A * | 9/1999 | Jeong ....................... 365/230.06 |
| 6,097,651 A * | 8/2000 | Chan et al. ..................... 365/203 |
| 6,445,621 B1 * | 9/2002 | Heightley ................ 365/189.11 |
| 7,382,153 B2 | 6/2008 | Ou-yang et al. |
| 7,679,395 B1 | 3/2010 | Yang et al. |
| 2008/0024160 A1 | 1/2008 | Ou-yang et al. |
| 2010/0066410 A1 | 3/2010 | Yang et al. |
| 2010/0111706 A1 * | 5/2010 | Abraham ..................... 417/44.1 |

FOREIGN PATENT DOCUMENTS

| WO | WO03003483 | 4/2003 |
| WO | WO03034390 | 4/2003 |

* cited by examiner

*Primary Examiner* — Farley Abad
(74) *Attorney, Agent, or Firm* — Alan A. R. Cooper; Wade J. Brady, III; Frederick J. Telecky, Jr.

(57) ABSTRACT

In versions 1.1a and 1.2 of the DISPLAYPORT™ standard, capacitors are used between a sourcing circuit and a switch for the auxiliary channel. As a result, these capacitors are generally uncharged when the switch activates the auxiliary channel, which can result in errors. Here, a switch is employed that uses precharge circuits to precharge these capacitors. Thus, errors due to charging of these capacitors can be reduced.

14 Claims, 3 Drawing Sheets

US 8,495,273 B2

SWITCH EMPLOYING PRECHARGE CIRCUITS

TECHNICAL FIELD

The invention relates generally to a switch and, more particularly, to a switch that employs precharge circuits.

BACKGROUND

Referring to FIG. 1 of the drawings, the reference numeral 100 generally designates a conventional DISPLAYPORT™ system that that includes a switch. DISPLAYPORT™ is a trademark of the Video Electronics Standards Association (920 Hillview Court, Suite 140, Milpital Calif. 95035), and refers to a video communication standard, specifically versions 1.1a and 1.2 (which are hereby incorporated by reference for all purposes). According to versions 1.1a and 1.2 of DISPLAYPORT™ standard, communications between a sourcing circuit 102 and a sinking circuit 104 are performed across three channels: a main channel 110, an auxiliary channel 111, and a hot plug detect or HPD channel 112. The main channel 110 is a unidirectional communication channel from the sourcing circuit 102 to the sinking circuit 104. The HPD channel is a unidirectional communication channel from the sinking circuit 104 to the sourcing circuit 102, and the auxiliary channel 111 is bi-directional.

For the auxiliary channel 111, which provides differential signals AUXM and AUXP, versions 1.1a and 1.2 of the DISPLAYPORT™ standard dictate sets of components that are to be used to couple the sourcing circuit 102, the switch 132, and the sinking circuit 104 together. Capacitors C1 and C2 (which have a capacitance between about 75 nF to about 200 nF) are used between the souring circuit 102 and switch 132. Voltage dividers (resistors R1/R2 and resistors R3/R4) are coupled across cables 106 and 108 (respectively) between a voltage source VDD and ground. Generally, resistors R1 and R3 each have a resistance of about 100 kΩ, and resistors R2 and R4 each have a resistance of about 1MΩ. Additionally, capacitors C1 and C2 (which also have capacitances between about 75 nF and about 200 nF) are provided between cables 106 and 108 (respectively) and sinking circuit 104.

In operation, the switch 132 can enable and disable communications between the sourcing circuit 102 and sinking circuit 104. Typically, switch 132 is a multiplexer with multiple sourcing and/or sinking circuits; for simplicity sake, however, only one sinking circuit 104 and one sourcing circuit 106 are shown. Within switch 132, there are terminals or pins that couple the main, auxiliary, and HPD channels of system 100, but, for simplicity sake, pins or terminals 116, 118, 120, 122, 124, 126, 128, and 130 are shown. Generally, to couple and decouple, sourcing circuit 102 from sinking circuit 104, controller provides an enable or control signal EN to switches S1 and S2 (which are generally CMOS pass-gates). Some problems that arise with this arrangement, however, are link establishment errors. When controller 114 activates switches S1 and S2, capacitors C1 and C2 begin charging, but to determine whether there is a link between sourcing circuit 102 and sinking circuit 104, the sinking circuit 104 measures the voltages on the auxiliary channel 111. As a result of the charging and depending on the starting potentials or voltages of capacitors C1 and C2, the voltages on the auxiliary channel 111 can be outside of an expected range, which means that the sinking circuit 104 may not assert the HPD channel 112 or may incorrectly de-assert the HPD channel 112.

Therefore, there is a need for an improved DISPLAYPORT™ switch.

Some other examples of conventional circuits are: U.S. Pat. Nos. 7,382,153; 7,679,395; U.S. Patent Pre-Grant Publ. No. 2008/0024160; U.S. Patent Pre-Grant Publ. No. 2010/0066410; PCT Publ. No. WO2003034383; and PCT Publ. No. 2003034390.

SUMMARY

A preferred embodiment of the present invention, accordingly, provides an apparatus. The apparatus comprises a first terminal that receives a negative portion of a differential DISPLAYPORT auxiliary signal; a second terminal that receives a positive portion of the differential DISPLAYPORT auxiliary signal; a third terminal; a fourth terminal; a first switch that is coupled between the first terminal and the third terminal; a second switch that is coupled between the second terminal and the fourth terminal; a first precharge circuit that is coupled to the first terminal; a second precharge circuit that is coupled to the second terminal; and a controller that is coupled to the first switch, the second switch, the first precharge circuit, and the second precharge circuit, wherein the controller activates the first and second precharge circuits while the first and second switches are deactivated, and wherein the controller activates the first and second switches while the first and second precharge circuits are deactivated.

In accordance with a preferred embodiment of the present invention, the apparatus further comprises: a first channel that receives a DISPLAYPORT main signal; and a second channel that receives a DISPLAYPORT hot plug detect (HPD) signal.

In accordance with a preferred embodiment of the present invention, the first and second precharge circuits further comprise first and second switched voltage dividers, respectively.

In accordance with a preferred embodiment of the present invention, the first switched voltage divider further comprises: a third switch that receives a first voltage and that is coupled to the controller so as to be controlled by the controller; a fourth switch that receives a second voltage and that is coupled to the controller so as to be controlled by the controller; a first resistor that is coupled between the third switch and the first terminal; and a second resistor that is coupled between the fourth switch and the first terminal.

In accordance with a preferred embodiment of the present invention, the second switched voltage divider further comprises: a fifth switch that receives the first voltage and that is coupled to the controller so as to be controlled by the controller; a sixth switch that receives the second voltage and that is coupled to the controller so as to be controlled by the controller; a third resistor that is coupled between the fifth switch and the second terminal; and a fourth resistor that is coupled between the sixth switch and the second terminal.

In accordance with a preferred embodiment of the present invention, the first voltage is a supply voltage, and wherein the second voltage is ground.

In accordance with a preferred embodiment of the present invention, the first and second precharge circuits further comprise first and second switched pulling circuits, respectively.

In accordance with a preferred embodiment of the present invention, the first switched pulling circuit further comprises: a third switch that receives a first voltage and that is coupled to the controller so as to be controlled by the controller; and a first resistor that is coupled between the third switch and the first terminal.

In accordance with a preferred embodiment of the present invention, the first switched pulling circuit further comprises: a fourth switch that receives a second voltage and that is coupled to the controller so as to be controlled by the controller; and a second resistor that is coupled between the fourth switch and the second terminal.

In accordance with a preferred embodiment of the present invention, an apparatus is provided. The apparatus comprises a DISPLAYPORT sourcing circuit having a main channel, an auxiliary channel, and an HPD channel; a first capacitor that is coupled to a negative terminal of the auxiliary channel of DISPLAYPORT sourcing circuit; a second capacitor that is coupled to a positive terminal of the auxiliary channel of the DISPLAYPORT sourcing circuit; a DISPLAYPORT sinking circuit having a main channel, an auxiliary channel, and an HPD channel; a third capacitor that is coupled to a negative terminal of the auxiliary channel of the DISPLAYPORT sinking circuit; a fourth capacitor that is coupled to a positive terminal of the auxiliary channel of the DISPLAYPORT sinking circuit; a first resistor that is coupled between ground and the third capacitor; a second resistor that is coupled between a voltage source and the fourth capacitor; a first cable that is coupled to the third capacitor; a second cable that is coupled to the fourth capacitor; a third resistor that is coupled between the voltage source and the first cable; a fourth resistor that is coupled between ground and the second cable; a DISPLAYPORT switch having: a main channel that is coupled between the main channel of the DISPLAYPORT sourcing circuit and the main channel of the DISPLAYPORT sinking circuit; an HPD channel that is coupled between the HPD channel of the DISPLAYPORT sourcing circuit and the HPD channel of the DISPLAYPORT sinking circuit; a first terminal that is coupled to the first capacitor; a second terminal that that is coupled to the second capacitor; a third terminal that is coupled to the first cable; a fourth terminal that is coupled to the second cable; a first switch that is coupled between the first terminal and the third terminal; a second switch that is coupled between the second terminal and the fourth terminal; a first precharge circuit that is coupled to the first terminal; a second precharge circuit that is coupled to the second terminal; and a controller that is coupled to the first switch, the second switch, the first precharge circuit, and the second precharge circuit, wherein the controller activates the first and second precharge circuits while the first and second switches are deactivated, and wherein the controller activates the first and second switches while the first and second precharge circuits are deactivated.

In accordance with a preferred embodiment of the present invention, the first switched voltage divider further comprises: a third switch that is coupled to the voltage source and that is coupled to the controller so as to be controlled by the controller; a fourth switch that is coupled to ground and that is coupled to the controller so as to be controlled by the controller; a fifth resistor that is coupled between the third switch and the first terminal; and a sixth resistor that is coupled between the fourth switch and the first terminal.

In accordance with a preferred embodiment of the present invention, the second switched voltage divider further comprises: a fifth switch that is coupled to the voltage source and that is coupled to the controller so as to be controlled by the controller; a sixth switch that is coupled to ground and that is coupled to the controller so as to be controlled by the controller; a sixth resistor that is coupled between the fifth switch and the second terminal; and a seventh resistor that is coupled between the sixth switch and the second terminal.

In accordance with a preferred embodiment of the present invention, the first switched pulling circuit further comprises: a third switch that is coupled to the voltage source and that is coupled to the controller so as to be controlled by the controller; and a fifth resistor that is coupled between the third switch and the first terminal.

In accordance with a preferred embodiment of the present invention, the first switched pulling circuit further comprises: a fourth switch that is coupled to ground and that is coupled to the controller so as to be controlled by the controller; and a second resistor that is coupled between the fourth switch and the second terminal.

In accordance with a preferred embodiment of the present invention, a method is provided. The method comprises de-asserting an enable signal by a controller so as to isolate at least a portion of a DISPLAYPORT auxiliary channel that is coupled to a DISPLAYPORT sourcing circuit from at least a portion of the DISPLAYPORT auxiliary channel that is coupled to a DISPLAYPORT sinking circuit, wherein the enable signal is provided to a first switch coupled between a first terminal and a second terminal, and wherein the enable signal is provided to a second switch coupled between a third terminal and a fourth terminal; activating a first precharge circuit and a second precharge circuit when the enable signal is de-asserted; and precharging a first capacitor and a second capacitor that are coupled to the first terminal and the third terminal, respectively.

In accordance with a preferred embodiment of the present invention, the step of activating further comprises: activating a third switch so as to coupled the first capacitor to a voltage source through a first resistor; and activating a fourth switch so as to coupled the second capacitor to ground through a second resistor.

In accordance with a preferred embodiment of the present invention, the step of activating further comprises: activating a fifth switch so as to coupled the first capacitor to ground through a third resistor; and activating a fourth switch so as to coupled the second capacitor to the voltage source through a fourth resistor.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
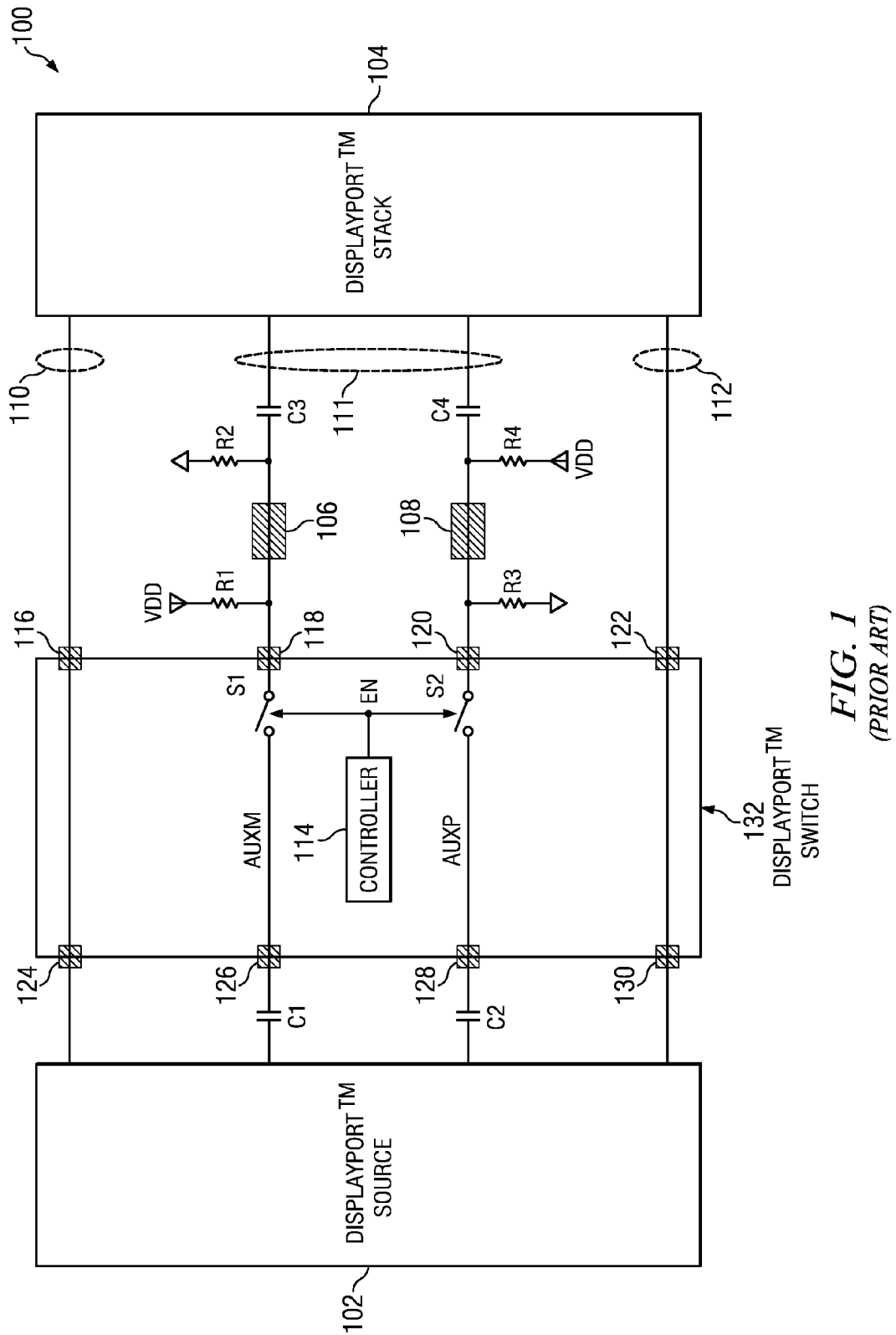
FIG. 1 is a block diagram of a conventional DISPLAYPORT™ system that includes a switch.

Refer now to the drawings wherein depicted elements are, for the sake of clarity, not necessarily shown to scale and wherein like or similar elements are designated by the same reference numeral through the several views.

Figure 2:
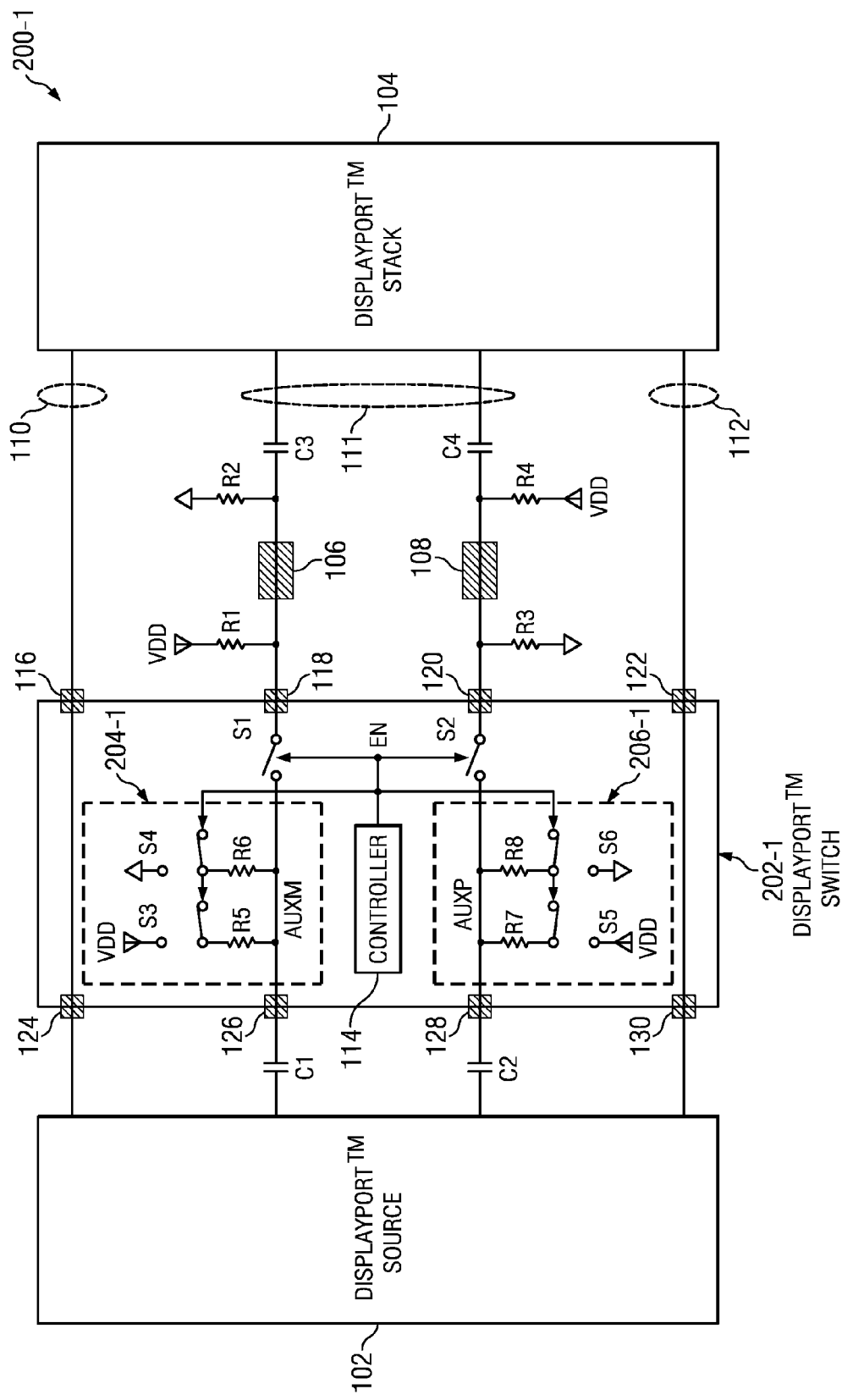
FIGS. 2 and 3 are block diagrams of examples of DISPLAYPORT™ systems in accordance with a preferred embodiment of the present invention.

Turning to FIG. 2 of the drawings, system 200-1 can be seen. In system 200-1, a switch 202-1 having precharge circuits 204-1 and 206-1 is employed. In this configuration, the precharge circuits 204-1 and 206-1 are switched voltage dividers. Preferably, these voltage dividers are comprised of resistors R5/R6 and R7/R8 coupled in series with one another between switches S3/S4 and S5/S6 (respectively) with terminals 126 and 128 coupled to the node between resistors R5/R6 and R7/R8 (respectively). When the enable signal EN is de-asserted (leaving switches 51 and S2 open), switches S3 through S6 (which are generally CMOS passgates) are closed. As a result, the capacitors C1 and C2 are charged to a desired voltage based on the value of the resistors R5 through R7 and the voltage of voltage source VDD. Thus, when the enable signal EN is asserted so that switches 51 and S2 are closed and switches S3 through S6 are open, the capacitors C1 and C2 are precharged and do not fluctuate, which generally prevents the sinking circuit 104 from improperly asserted or de-asserting the HPD channel 112, and which also generally ensures that the auxiliary signals are not corrupted during the charging period of capacitors C1 and C2 because of improper voltage levels.

Figure 3:
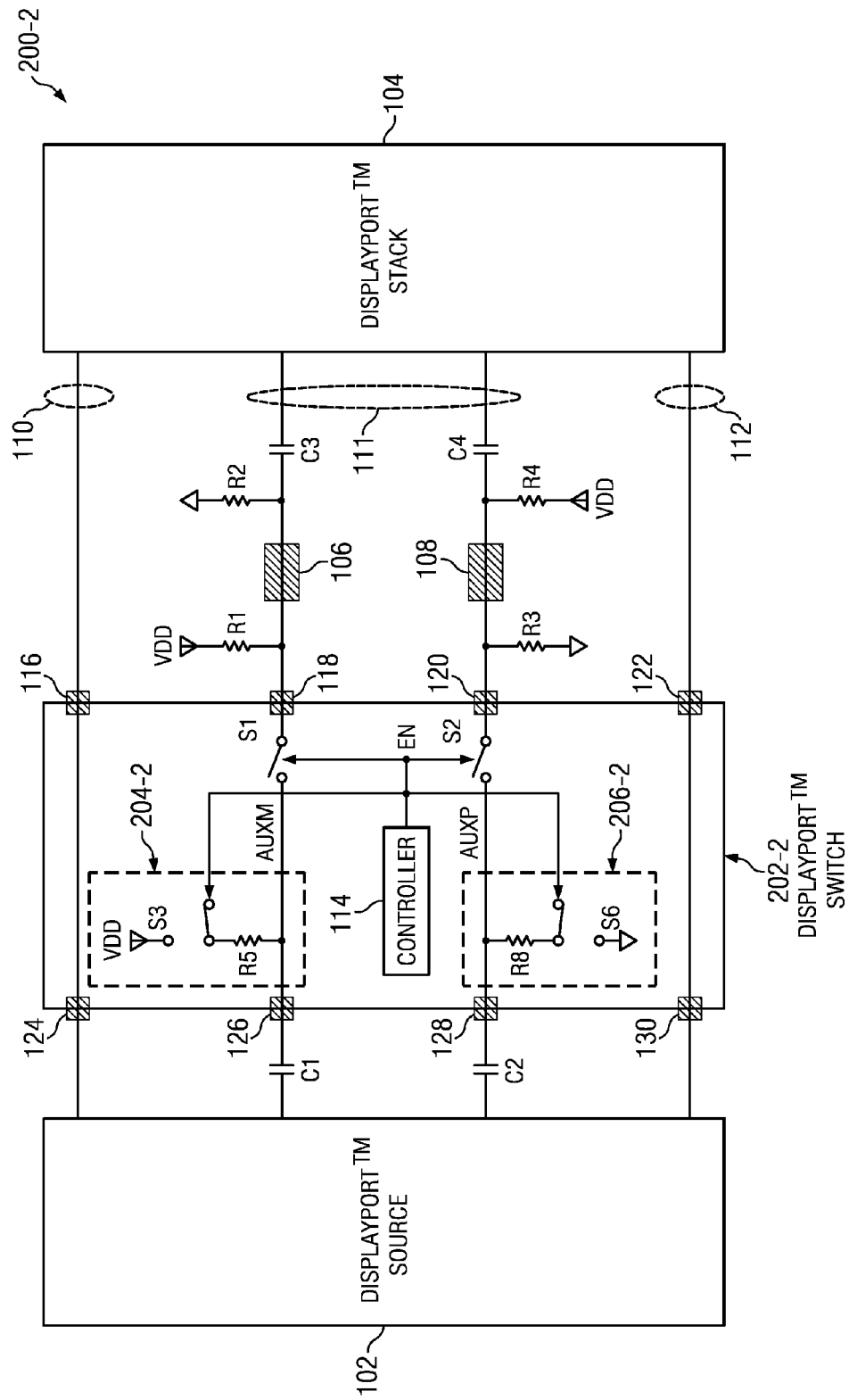

As an alternative, which is shown in FIG. 3, precharge circuits 204-2 and 206-2 of switch 202-2 can be comprised of switched pulling circuits. Preferably, a pull-up circuit is used for the portion of the auxiliary channel 111 carrying the negative portion AUXM of the auxiliary channel 111 differential signal, and a pull-down circuit is used for the portion of auxiliary channel 111 carrying the positive portion AUXP of the auxiliary channel 111 differential signal. The pull-up circuit generally comprises resistor R5 and switch S3, where the resistance of resistor R5 and voltage of voltage source VDD can be chosen to precharge capacitor C1 to a predetermined voltage. Additionally, pull-down circuit is generally comprised of resistor R8 and switch S6, where resistor R8 is chosen to precharge capacitor C2 to a predetermined voltage.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:

1. An apparatus including a switch having a first channel and a second channel, comprising:
   a first terminal that receives a negative portion of a differential auxiliary signal;
   a second terminal that receives a positive portion of the differential auxiliary signal;
   a third terminal;
   a fourth terminal;
   a first switch that is coupled between the first terminal and the third terminal;
   a second switch that is coupled between the second terminal and the fourth terminal;
   a first precharge circuit that is coupled to the first terminal;
   a second precharge circuit that is coupled to the second terminal; and
   a controller that is coupled to the first switch, the second switch, the first precharge circuit, and the second precharge circuit, wherein the controller activates the first and second precharge circuits while the first and second switches are deactivated, and wherein the controller activates the first and second switches while the first and second precharge circuits are deactivated,
   wherein the first and second precharge circuits further comprise first and second switched voltage dividers, respectively,
   wherein the first switched voltage divider further comprises:
      a third switch that receives a first voltage and that is coupled to the controller so as to be controlled by the controller;
      a fourth switch that receives a second voltage and that is coupled to the controller so as to be controlled by the controller;
      a first resistor that is coupled between the third switch and the first terminal; and
      a second resistor that is coupled between the fourth switch and the first terminal.

2. The apparatus of claim 1, wherein the apparatus further comprises:
   the first channel receives a main signal; and
   the second channel receives a hot plug detect (HPD) signal.

3. The apparatus of claim 1, wherein the second switched voltage divider further comprises:
   a fifth switch that receives the first voltage and that is coupled to the controller so as to be controlled by the controller;
   a sixth switch that receives the second voltage and that is coupled to the controller so as to be controlled by the controller;
   a third resistor that is coupled between the fifth switch and the second terminal; and
   a fourth resistor that is coupled between the sixth switch and the second terminal.

4. The apparatus of claim 3, wherein the first voltage is a supply voltage, and wherein the second voltage is ground.

5. The apparatus of claim 1, wherein the first and second precharge circuits further comprise first and second switched pulling circuits, respectively.

6. The apparatus of claim 5, wherein the first switched pulling circuit further comprises:
   a third switch that receives a first voltage and that is coupled to the controller so as to be controlled by the controller; and
   a first resistor that is coupled between the third switch and the first terminal.

7. The apparatus of claim 6, wherein the first switched pulling circuit further comprises:
   a fourth switch that receives a second voltage and that is coupled to the controller so as to be controlled by the controller; and
   a second resistor that is coupled between the fourth switch and the second terminal.

8. The apparatus of claim 7, wherein the first voltage is a supply voltage, and wherein the second voltage is ground.

9. An apparatus, comprising:
   a sourcing circuit having a main channel, an auxiliary channel, and an hot plug detect (HPD) channel;
   a first capacitor that is coupled to a negative terminal of the auxiliary channel of sourcing circuit;
   a second capacitor that is coupled to a positive terminal of the auxiliary channel of the sourcing circuit;
   a sinking circuit having a main channel, an auxiliary channel, and an HPD channel;
   a third capacitor that is coupled to a negative terminal of the auxiliary channel of the sinking circuit;

a fourth capacitor that is coupled to a positive terminal of the auxiliary channel of the sinking circuit;
a first resistor that is coupled between ground and the third capacitor;
a second resistor that is coupled between a voltage source and the fourth capacitor;
a first cable that is coupled to the third capacitor;
a second cable that is coupled to the fourth capacitor;
a third resistor that is coupled between the voltage source and the first cable;
a fourth resistor that is coupled between ground and the second cable;
the switch having:
  a main channel that is coupled between the main channel of the sourcing circuit and the main channel of the sinking circuit;
  an HPD channel that is coupled between the HPD channel of the sourcing circuit and the HPD channel of the sinking circuit;
  a first terminal that is coupled to the first capacitor;
  a second terminal that that is coupled to the second capacitor;
  a third terminal that is coupled to the first cable;
  a fourth terminal that is coupled to the second cable;
  a first switch that is coupled between the first terminal and the third terminal;
  a second switch that is coupled between the second terminal and the fourth terminal;
  a first precharge circuit that is coupled to the first terminal;
  a second precharge circuit that is coupled to the second terminal; and
  a controller that is coupled to the first switch, the second switch, the first precharge circuit, and the second precharge circuit, wherein the controller activates the first and second precharge circuits while the first and second switches are deactivated, and wherein the controller activates the first and second switches while the first and second precharge circuits are deactivated,
  wherein the first and second precharge circuits further comprise first and second switched voltage dividers, respectively
wherein the first switched voltage divider further comprises:
a third switch that is coupled to the voltage source and that is coupled to the controller so as to be controlled by the controller;
a fourth switch that is coupled to ground and that is coupled to the controller so as to be controlled by the controller;
a fifth resistor that is coupled between the third switch and the first terminal; and
a sixth resistor that is coupled between the fourth switch and the first terminal.

10. The apparatus of claim 9, wherein the second switched voltage divider further comprises:
a fifth switch that is coupled to the voltage source and that is coupled to the controller so as to be controlled by the controller;
a sixth switch that is coupled to ground and that is coupled to the controller so as to be controlled by the controller;
a sixth resistor that is coupled between the fifth switch and the second terminal; and
a seventh resistor that is coupled between the sixth switch and the second terminal.

11. The apparatus of claim 9, wherein the first and second precharge circuits further comprise first and second switched pulling circuits, respectively.

12. The apparatus of claim 11, wherein the first switched pulling circuit further comprises:
a third switch that is coupled to the voltage source and that is coupled to the controller so as to be controlled by the controller; and
a fifth resistor that is coupled between the third switch and the first terminal.

13. The apparatus of claim 12, wherein the first switched pulling circuit further comprises:
a fourth switch that is coupled to ground and that is coupled to the controller so as to be controlled by the controller; and
a second resistor that is coupled between the fourth switch and the second terminal.

14. A method comprising:
de-asserting an enable signal by a controller so as to isolate at least a portion of a auxiliary channel that is coupled to a sourcing circuit from at least a portion of the auxiliary channel that is coupled to a sinking circuit, wherein the enable signal is provided to a first switch coupled between a first terminal and a second terminal, and wherein the enable signal is provided to a second switch coupled between a third terminal and a fourth terminal;
activating a first precharge circuit and a second precharge circuit when the enable signal is de-asserted; and
precharing a first capacitor and a second capacitor that are coupled to the first terminal and the third terminal, respectively,
wherein the step of activating further comprises:
  activating a third switch so as to couple the first capacitor to a voltage source through a first resistor; and
  activating a fourth switch so as to couple the second capacitor to ground through a second resistor;
  activating a fifth switch so as to couple the first capacitor to ground through a third resistor; and
  activating a fourth switch so as to couple the second capacitor to the voltage source through a fourth resistor.

* * * * *